Figure 1:
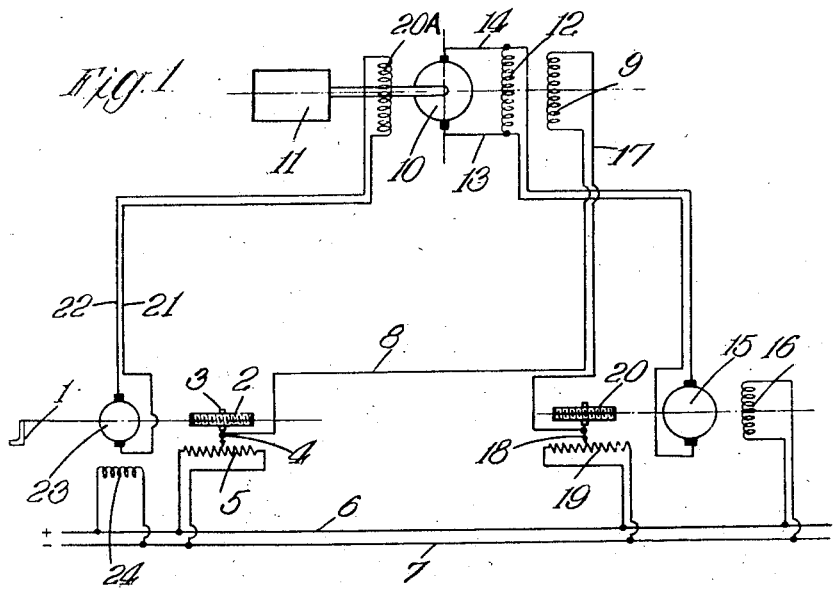

Aug. 1, 1939.    N. JAPOLSKY    2,168,032

ELECTRIC TRANSMISSION SYSTEM

Original Filed Oct. 10, 1936

INVENTOR:
NICHOLAS JAPOLSKY
BY Haseltine Lake & Co.
ATTORNEYS

Patented Aug. 1, 1939

2,168,032

UNITED STATES PATENT OFFICE 2,168,032

ELECTRIC TRANSMISSION SYSTEM

Nicholas Japolsky, Highgate, London, England

Original application October 10, 1936, Serial No. 104,965. Divided and this application February 12, 1938, Serial No. 190,219. In Great Britain October 5, 1935

5 Claims. (Cl. 172—239)

This invention relates to electric distant control systems, i. e. electric transmission systems, of the type in which a transmitter is arranged to control the movement of a remote receiver or receivers so that when a predetermined movement is imparted to the transmitter the receiver or receivers will reproduce such movement. Generally speaking, systems of the above type fall into two broad classifications. There is the mono-periodic system and poly-periodic system. The mono-periodic system is one in which a transmitter and receiver will be electrically in step, i. e., in a stabilized position with respect to one another, only in one position or relative adjustment, which position of adjustment may in this case be regarded as the position of coincidence of the transmitter and receiver. The poly-periodic systems are such, however, that the receiver has a number of positions in which it is electrically stabilized with respect to the transmitter, so that when in any one of these positions the transmitter and receiver will work correctly together. It will at once be observed that with a mono-periodic system, when the machines forming the transmitter and receiver are running stably, they must be in a definite positional coincidence, whereas a poly-periodic system may have more than one stable electrical position of coincidence. Thus, if a polyperiodic transmission system is used there will be the inherent disadvantage of the uncertainty in what positional relation the transmitter and receiver will run. On the other hand, mono-periodic systems have a great disadvantage in that they tend to hunt as will be shown more fully hereinafter.

The poly-periodic system has the well-known advantage of greater accuracy, and furthermore the synchronising force will be understood to be greater in a poly-periodic system when the whole cycle of the variation of energy is considered, since generally in a given range of positions the synchronising force in a system will be higher the greater the number of periods included within that range, for a given maximum energy of the system.

In the specification of my co-pending parent patent application Serial No. 104,965, filed October 10, 1936, there are described transmission systems which are mono-periodic and also systems which may operate mono-periodically and poly-periodically. When the operation is mono-periodic it is essential that the tendency to hunting of the receiver should be checked. This present invention is confined to the prevention of hunting in systems which are at all times monoperiodic. Following the principles of the invention, which will be explained in greater detail hereinafter, a mono-periodic transmission system includes a D. C. generator operating as the transmitter and at least one D. C. motor operating as the receiver, the D. C. motor being arranged to be actuated by forces which are dependent upon the positional displacement which may exist between the transmitter and receiver, and which are also dependent upon the difference in speeds of the transmitter and receiver.

Figure 2:
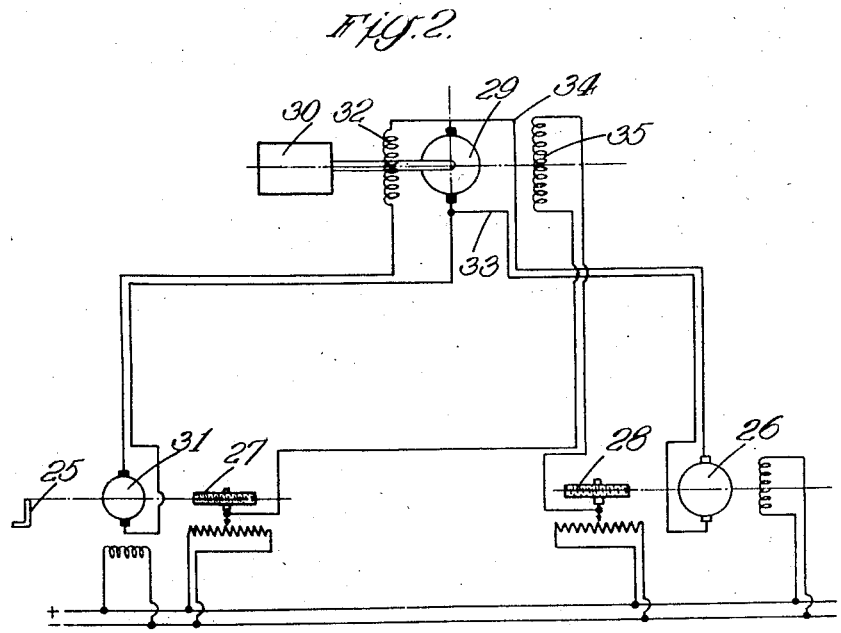

In order that the said invention may be clearly understood and readily carried into effect the same will now be more fully described with reference to the accompanying drawing, in which:

Figure 1 illustrates diagrammatically the electric connections for a mono-periodic transmission system, means for the prevention of hunting being provided, and Figure 2 is a diagrammatic illustration similar to Figure 1 but shows a modification of the means for preventing hunting.

In Figure 1 of the accompanying drawing the transmitter 1 is indicated diagrammatically by an operating handle which is connected with a displacement recorder. The displacement recorder consists of a lead screw 2 adapted upon rotation to move a nut 3 which carries a contact arm 4. The arm 4 slides upon a distributed resistance wire 5, the ends of which are directly connected across the mains leads 6 and 7, the arm 4 of the displacement recorder having a connection 8 which leads to an excitation winding 9. The winding 9 is arranged to influence the field of a D. C. generator armature 10, the latter being driven from any convenient source of rotative energy 11. An excitation winding 12 is arranged in shunt with the armature 10 being connected in the leads 13, 14. The armature 10 and winding 12 are so designed in relation to one another that when the armature is rotating at its usual speed the generator thus formed will not be self-exciting. Thus the leads 13, 14 which are connected to the armature 15 of a D. C. motor having constant excitation through a winding 16 connected to the mains 6 and 7, will not supply current to the armature 15 in sufficient quantity to cause the same to rotate.

The winding 9 in addition to being connected by the lead 8, has also a further connection 17 extending to a second displacement recorder contact arm 18. The latter is adapted to move over a distributed resistance wire 19 and as in the case of the first mentioned displacement recorder, a lead screw 20 is adapted to move the contact arm. The lead screw 20 is actuated by rotation of the armature 15.

In the apparatus so far described, it will be observed that when the transmitter 1 is actuated the contact arm 4 will be displaced along the resistance 5 and the potential between the arm 4 and the arm 18 will be changed. In the normal way both the resistances 19 and 5 have points of equal potential intensity, since they are both similarly distributed resistances, and are both connected across the mains 6 and 7. The arms 4 and 18 will therefore have positions in which the potential between them is zero and any displacement of the arm 4 by actuation of the transmitter 1 will result in a potential being developed between the two arms of the first and second recorders. The development of such a potential will lead to current flow in the winding 9, which will produce a magneto-motive force acting in conjunction with that due to the winding 12 whereupon the armature 10 will be sufficiently excited to produce rotation of the armature 15. The latter will tend to rotate and to bring the displacement recorder having the arm 18, into a position such that the potential between the arms 4 and 18 will be zero. It will, however, be appreciated that the position in which the potential between the arms 4 and 18 is zero, will not be reached directly but that hunting of the receiver armature 15 will take place. Approximately, such hunting will be represented by simple harmonic oscillation of the receiver armature with respect to the transmitter. For the purpose of illustration let the position of the transmitter with respect to some fixed datum-line be $x_1$, and that of the receiver armature with respect to the same fixed datum-line, be $x_2$. Then the general differential equation for the motion of the armature 15 will be as follows:

$$(\ddot{x}_1 - \ddot{x}_2) = -a^2(x_1 - x_2) \pm F$$

where $a$ is a constant and $F$ is proportional to the effect of friction. In the above equation and in the equations hereinafter the Newtonian system of symbols has been used to indicate differential co-efficients with respect to time.

The general integral of the equation above stated may be shown to be:

$$(x_1 - x_2) = A_1 e^{(iat)} + A_2 e^{-(iat)} + f(F.t)$$

In order to determine the arbitrary constants $A_1$ and $A_2$, let it be supposed that at the commencement of the process $t$ is equal to zero, and that the relative speed of receiver to transmitter was then $\dot{x}_0$, let the relative position of these two elements i. e. $(x_1 - x_2)$ be represented by $x_0$. Then, substituting in the general integral above stated:—

$$ai(A_1 - A_2) = \dot{x}_0$$

hence
$$A_1 + A_2 = x_0$$

$$A_1 = \frac{1}{2}\left(x_0 - i\frac{\dot{x}_0}{a}\right)$$

and
$$A_2 = \frac{1}{2}\left(x_0 + i\frac{\dot{x}_0}{a}\right)$$

Substituting the values for $A_1$ and $A_2$ in the general integral obtained:

$$(x_1 - x_2) = \frac{1}{2}x_0(e^{iat} + e^{-iat}) - \frac{1}{2} \cdot \frac{i\dot{x}_0}{a} \cdot (e^{iat} - e^{-iat}) + f(F.t)$$

or, $$(x_1 - x_2) = x_0 \cos at + \frac{\dot{x}_0}{a}\sin at + f(F.t)$$

The final solution thus derived will be recognized as the usual periodic solution resulting from a harmonic equation. In the solution there is no damping factor so that the oscillation will be unaffected other than by friction. It could easily be shown by a more detailed investigation that friction does not always reduce the hunting, and will even, in certain instances, increase the hunting effect.

Returning to a consideration of Figure 1 of the drawing it will be seen that an additional excitation winding 20A is shown as acting upon the armature 10 of the intermediate D. C. generator. The winding 20A is connected by leads 21 and 22 to the armature 23 of a D. C. generator having constant field excitation by means of a winding 24 connected across the mains 6, 7. The armature 23 is connected mechanically with the transmitter 1 so that when the latter is rotated the armature 23 causes current to be supplied to the winding 20A. The magneto-motive force developed by the winding is therefore proportional to the speed of operation of the transmitter 1. The back E. M. F. from the armature 15 will be proportional to the speed of the armature 15 by reason of the fact that a constant excitation is provided through the winding 16. By virtue of the design of the excitation winding 12 and armature 10, in the way already indicated so that the D. C. generator as a whole is not self-exciting, the back E. M. F. of the armature 15 will, in effect, control the magneto-motive force developed in the excitation winding 12, thus the windings 12 and 20A may be so arranged that their magneto-motive forces will act in opposition. A control component will therefore be introduced in the armature 10, depending upon the difference of magneto-motive forces in the windings 12 and 20A, and therefore upon the difference in speed of the transmitter and the armature 15.

The resulting effect of introducing a component proportional to the difference in speeds of the armature and transmitter will be apparent in the equation which represents hunting due to oscillation of the receiver armature 15. The equation will no longer be of the simple harmonic character previously given but will be as follows:

$$\ddot{x} = -2b\dot{x} - a^2 x$$

It will be observed that into the original equation an expression $-2b\dot{x}$ has been introduced and this is the component which represents difference in speeds of the transmitter and receiver. In the equation, for the sake of simplicity, $\ddot{x}$ has been taken to represent the relative acceleration of the armature and transmitter, and similarly $x$ the relative displacement between them, and $\dot{x}$ the relative velocity. The constant $b$ is a constant which depends upon the construction of the intermediate D. C. generator and other factors to be referred to hereinafter. A term representing friction has been omitted from the above equation since its effect will in the solution be precisely the same as that for the original equation. The integral in this case will be:

$$x = e^{-bt}(A_1 e^{t\sqrt{b^2-a^2}} + A_2 e^{-t\sqrt{b^2-a^2}})$$

Assuming now as before that in the initial position, when $t$ equals zero, $x_0$ will represent the relative displacement, $\dot{x}_0$ the relative velocity and $\ddot{x}_0$ the relative acceleration, the following expressions for the determination of the arbitrary constants $A_1$ and $A_2$ are obtained:

$$A_1 + A_2 = x_0$$
$$-b.(A_1+A_2) + \sqrt{b^2-a^2}.(A_1-A_2) = \dot{x}_0$$
$$\sqrt{b^2-a^2}.(A_1-A_2) = \dot{x}_0 + bx_0$$

By substitution in the solution for $x$ $$x = e^{-bt}\left(x_0 \cos t\sqrt{a^2-b^2} - \frac{\dot{x}_0+bx_0}{\sqrt{a^2-b^2}} \sin t\sqrt{a^2-b^2}\right)$$

From the solution for $x$ given above it will be observed that if $a$ equals $b$ oscillation will not occur, and in any case due to the presence of the transient $e^{-bt}$ any oscillation will be damped.

In Figure 2 of the drawing an alternative method of bringing in the component proportion to the difference in speed of the transmitter and receiver is shown. As before a D. C. system is illustrated there being a transmitter 25 and a receiver armature 26, and displacement recorders 27 and 28. An intermediate D. C. generator is also provided, and has an armature shaft 29 driven by a convenient source of rotative power 30, there being also a D. C. generator 31 actuated by the transmitter. The armature of the D. C. generator 31 is arranged to be in series with a winding 32 and the input to the armature 29. Connections 33, 34 from the armature 26 lead also to the output of the armature 29. A winding 35 is, as before, connected with both displacement recorders 27 and 28.

In this construction the component proportional to the difference in speed of the transmitter and the receiver is introduced in the following way. An E. M. F. is developed across the generator armature 29 sufficient to overcome the back E. M. F. of the motor armature 26. The latter which has a constant field excitation in turn develops a back E. M. F. which is directly proportional to its speed, so that the E. M. F. across the armature 29 is also proportional to the speed of the receiver. The armature 31 similarly generates an E. M. F. proportional to its speed since it also has constant field excitation. The E. M. F.'s due to both the armature 26 and 31 are arranged in opposition so that the magneto-motive force developed by the winding 32 depends upon the difference of speed of the transmitter and receiver.

The apparatus described above is suitable only for mono-periodic transmission, direct current operation only being intended.

What I claim and desire to secure by Letters Patent of the United States is:

1. A mono-periodic electric transmission system comprising a D. C. generator whose output is dependent upon speed of operation arranged to act as the transmitter, and a D. C. motor whose speed is dependent upon its input, arranged to act as the receiver, connections between said D. C. generator constituting the transmitter and said D. C. motor constituting the receiver arranged to supply an input to the D. C. motor receiver according to the difference in speeds of the transmitter and receiver, and displacement recording means associated with the receiver and the transmitter and controlling the input through said connections to the receiver so that such input is proportional to the difference in displacement as recorded by said displacement recording means.

2. A mono-periodic transmission system including a transmitter and at least one receiver, comprising a director member and displacement recording means associated therewith to constitute the transmitter, a D. C. motor forming the receiver, displacement recording means associated with the receiver, a connection between both said displacement recording means adapted to carry a current in magnitude proportional to the relative displacement recorded between the two recording means, a winding in circuit with said connection to produce an M. M. F. proportional to the current carried thereby, such M. M. F. being effective to produce a force proportional to transmitter-receiver displacement on the control of the receiver, and means for introducing into said receiver control a further component of force proportional to the difference in speeds of the transmitter and receiver.

3. A mono-periodic electric transmission system including a transmitter and at least one receiver arranged to be together capable of mono-periodic operation, comprising a D. C. generator connections between said generator and a D. C. motor constituting the receiver, a director member and a first displacement recording means associated with the transmitter, a second displacement recording means associated with the receiver, a connection between both said first and second displacement recording means, a winding included in said connection and adapted to carry current according to the degree of displacement of the transmitter and receiver, said winding being located so that its developed M. M. F. is effective upon said D. C. generator, a second winding arranged to be effective upon said D. C. generator and to develop an M. M. F. proportional to the speed of the transmitter, and a third winding effective upon said D. C. generator and arranged to develop an M. M. F. proportional to the speed of operation of the receiver, the M. M. F.'s produced by said second and third winding being in opposition.

4. A mono-periodic electric transmission system including a transmitter and at least one receiver arranged to be capable of mono-periodic operation with respect thereto, comprising a first D. C. generator having a rotor designed in such a way with respect to a first shunt-connected excitation winding that the generator will not, as a whole, be self-exciting, parallel connections from the rotor of said first D. C. generator to the rotor of a D. C. motor acting as the receiver, a second winding arranged as an excitation winding of said first D. C. generator, a second D. C. generator operated from the transmitter, connections between said second D. C. generator, and said second excitation winding, displacement recording means associated with both transmitter and receiver, a connection between such recording means adapted to carry a current proportional to displacement of the transmitter and receiver, a winding included in said connection and located as a third excitation winding of said first D. C. generator.

5. A mono-periodic electric transmission system including a transmitter and at least one receiver arranged to be capable of operating mono-periodically with respect thereto, comprising a first D. C. generator, a first field excitation winding associated with said generator, shunt connections between the rotor of said D. C. generator and the first excitation winding, said rotor and first field excitation winding being relatively so designed as not to afford a self-exciting machine, a second D. C. generator associated with the transmitter and having its output terminals connected in one of the shunt connections between said first exciting winding and said first D. C. generator, whereby said first excitation winding may experience the difference between the back E. M. F. of the receiver and the normal forward E. M. F. of the said second D. C. generator which is associated with the transmitter, displacement recorders associated with the transmitter and the receiver, and a connection between such recorders carrying a current proportional to displacement between the transmitter, and receiver, and a winding energised from such connection and acting as a second exciting winding of the first D. C. generator.

NICHOLAS JAPOLSKY.